No. 838,859. PATENTED DEC. 18, 1906.
H. HILLS.
COUPLING DEVICE.
APPLICATION FILED APR. 26, 1906.

Witnesses:
F. E. Anderson.
S. S. Grotta.

Inventor:
Henry Hills
By his Attorney,
Wm H. Blodgett

UNITED STATES PATENT OFFICE.

HENRY HILLS, OF HARTFORD, CONNECTICUT.

COUPLING DEVICE.

No. 838,859.　　　　　Specification of Letters Patent.　　　　　Patented Dec. 18, 1906.

Application filed April 26, 1906. Serial No. 313,758.

*To all whom it may concern:*

Be it known that I, HENRY HILLS, residing at Hartford, in the county of Hartford and State of Connecticut, have invented certain new and useful Improvements in Coupling Devices, of which the following is a specification.

This invention relates particularly to necklace-clasps; but the principle thereof may prove valuable in the construction of couplings generally, and therefore the invention is not limited to any specific use.

Heretofore clasps have been produced that are more or less reliable, but objectionable on account of the complication and number of their parts; and the object of this invention is the provision of a simple device that can always be thoroughly depended upon to remain securely fastened under various conditions.

Figure 1:
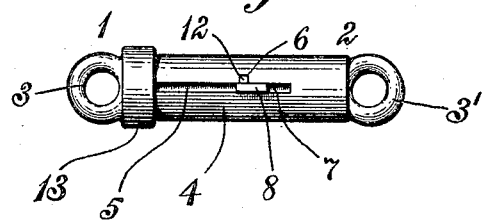
Figure 2:
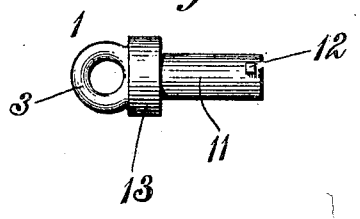
Figure 3:
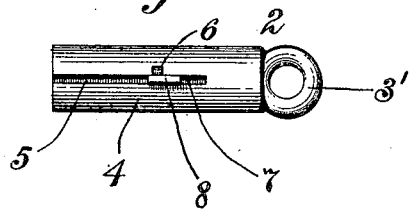
Figure 4:
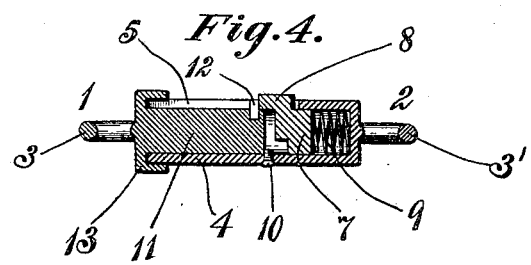
Figure 5:

In the accompanying drawings, Figure 1 is a view in elevation of the two members of the clasp connected. Fig. 2 is a view in elevation of the internal member. Fig. 3 is a view in elevation of the external member. Fig. 4 is a longitudinal sectional view of the two members in position for the keeper to be forced into place, and Fig. 5 is a detail view of the keeper-plunger.

Like numerals designate similar parts throughout the several views.

Referring to the drawings, the numeral 1 designates the internal member, and 2 the external member. Each member is provided at its end with an eye 3 3', to which the loose ends of a chain, necklace, or other device to be coupled may be secured.

Attached to or integral with the eye 3' of the external member 2 is a cylindrical tube 4, having a longitudinal slot 5 extending from its open end opposite the eye 3' for about two-thirds of the length of the tube, and intermediate the ends of said slot is a short transverse slot 6. Loosely fitted within the tube 4 is a plunger 7, having a projection or keeper 8 extending through the slot 5 and slightly above the surface of said tube. A spring 9 tends normally to force the plunger 7 forward against a retaining-screw or other stop 10, thereby causing the keeper 8, carried by said plunger, to cover the slot 6.

Attached to the eye 3 of the external member is a stud or shank 11, having a pin or projection 12 near one end, and on its opposite end a flanged cap 13.

To join the two members, the shank 11 is inserted in the tube 4, the pin 12 passing along the slot 5 and forcing back the keeper 8.

When the end of the tube 4 abuts against the cap 13 and is inclosed by the flange thereof, the pin 12 will register with the slot 6, and a slight turn of either member will cause said pin to enter said slot, thereby allowing the keeper to assume its normal position, where it will cover said pin, and thus prevent disengagement of the two members.

By sliding the keeper back against the tension of the spring 9 to the position shown in Fig. 4, the telescoping members may be readily disconnected.

Having thus described the invention, what I claim is—

1. In a device of the class described the combination with telescoping members, one of which is provided with longitudinal and transverse slots, and the other with a projection fitted in the longitudinal slot and adapted to enter said transverse slot, of a keeper carried by one of said members, and serving to cover said projection, and prevent the escape thereof from said transverse slot.

2. A coupling composed of two telescoping members, one having longitudinal and transverse slots, and the other a projection entering the longitudinal slot and adapted on the turning of the member to be inserted in the transverse slot, and a spring-actuated keeper located in said slotted member, and serving to lock the projection in said transverse slot.

3. A coupling comprising a longitudinally and transversely slotted shell having an eye at its closed end, a spring-actuated keeper having a projection working in the longitudinal slot of the shell, and a rotatable member having an eye at its outer end, and a projection also working in the longitudinal slot of the shell, said latter projection being adapted to enter the transverse slot of the shell and to be held against escape therefrom by said keeper.

In testimony whereof I affix my signature, in presence of two witnesses, at Hartford, Connecticut, this 24th day of April, 1906.

HENRY HILLS.

Witnesses:
　WM. H. BLODGETT, Jr.,
　FRANCES W. BLODGETT.